US011829795B2

(12) United States Patent
Nott et al.

(10) Patent No.: US 11,829,795 B2
(45) Date of Patent: Nov. 28, 2023

(54) TRIGGER SERVICE MANAGEMENT FOR ROBOTIC PROCESS AUTOMATION (RPA)

(71) Applicant: UiPath, Inc., New York, NY (US)

(72) Inventors: Brandon Nott, Bellevue, WA (US); Justin Marks, Redmond, WA (US)

(73) Assignee: UIPATH, INC., New York, NY (US)

( * ) Notice: Subject to any disclaimer, the term of this patent is extended or adjusted under 35 U.S.C. 154(b) by 59 days.

(21) Appl. No.: 16/730,041

(22) Filed: Dec. 30, 2019

(65) Prior Publication Data

US 2021/0200581 A1 Jul. 1, 2021

(51) Int. Cl.
G06F 3/00 (2006.01)
G06F 9/48 (2006.01)
G06F 9/4401 (2018.01)
G06F 9/54 (2006.01)
G06N 5/025 (2023.01)

(52) U.S. Cl.
CPC .......... G06F 9/4881 (2013.01); G06F 9/4411 (2013.01); G06F 9/542 (2013.01); G06N 5/025 (2013.01)

(58) Field of Classification Search
CPC ................................. G06F 9/54; G06N 5/025
USPC .......................................................... 719/310
See application file for complete search history.

(56) References Cited

U.S. PATENT DOCUMENTS 9,817,967 B1 * 11/2017 Shukla .................... B25J 9/1674
11,055,414 B2 * 7/2021 Claes ..................... G06F 21/575
2003/0037046 A1 * 2/2003 Trossell ................. G06F 3/0601
2012/0233834 A1 * 9/2012 Szechinski .............. B23P 19/04
29/407.01
2014/0289376 A1 * 9/2014 Chan ...................... G06F 3/0643
709/219
2015/0343635 A1 * 12/2015 Linnell ................... B25J 9/1661
700/249
2017/0001308 A1 * 1/2017 Bataller ............. G05B 19/0423
2017/0201803 A1 * 7/2017 Wald .................... H04N 21/435
2017/0372442 A1 12/2017 Mejias
2018/0207802 A1 * 7/2018 Dai ........................ B25J 9/1669

(Continued)

FOREIGN PATENT DOCUMENTS

CN 103227867 A 7/2013
CN 109684054 A 4/2019
JP 2005288628 A * 10/2005

OTHER PUBLICATIONS

Nicola Leonardi, Trigger-Action Programming for Personalising Humanoid Robot Behaviour. (Year: 2019).*

(Continued)

Primary Examiner — Lechi Truong
(74) Attorney, Agent, or Firm — Volpe Koenig

(57) ABSTRACT

Trigger(s) administration, development, distribution, coordination, registration, or coding for a software automation process or robotic process automation (RPA) is disclosed. A trigger(s) may be configured to run or execute by an outside service or component for an automation process in relation to an application and associated event(s). A definition file(s) or configuration file(s) may be created or utilized for a trigger(s) for an event. A separate or outside service or component may be configured to listen for the event in the process. Once a trigger(s) is met, an action or activity may run for the automation process on a client device using the outside service or component.

20 Claims, 6 Drawing Sheets

(56) References Cited

U.S. PATENT DOCUMENTS

| | | |
|---|---|---|
| 2019/0286736 A1 | 9/2019 | Sturtivant |
| 2019/0333359 A1* | 10/2019 | Moroniti ............... G08B 21/182 |
| 2020/0346353 A1* | 11/2020 | Szabo ................ G05B 19/4155 |

OTHER PUBLICATIONS

Pramila Rani, Emotion-Sensitive Robots—A New Paradigm for Human-Robot Interaction. (Year: 2004).*

Atsushi Nishikawa, FAce MOUSe: A Novel Human-Machine Interface for Controlling the Position of a Laparoscope. (Year: 2003).*

Clement Creusot, ActBot: Sharing High-level Robot AI Scripts. (Year: 2016).*

Klaus R. Dittrich, An Event/Trigger Mechanism to Enforce Complex Consistency Constraints in Design Databases. (Year: 1986).*

Rajesh Arumugam, DAvinCi: A Cloud Computing Framework for Service Robots. (Year: 2010).*

WinAutornation,Triggers and System Monitoring. Retrieved Dec. 11, 2019.

* cited by examiner

TRIGGER SERVICE MANAGEMENT FOR ROBOTIC PROCESS AUTOMATION (RPA)

BACKGROUND

Robotic process automation (RPA) may automate operations, functions, components, tasks, or workflows on enterprise platforms, virtual machines (VM), remote desktops, applications on the cloud, desktop applications, mobile applications, or the like. In RPA deployments with a robot(s), such as an attended robot(s), triggers may allow software or applications to respond to a user event, system event, a change to a file, external event on another system, or the like. A trigger may be utilized, loaded, run, exercised, or executed in relation to or within the context of an RPA process or RPA package for an application. For example, a trigger may listen and wait for a mouse event on an image or object until a trigger condition or event is met, satisfied, or expires.

When a large number of triggers are active on a local machine, client device, operating system tray, computing device, or the like, substantial resources may be consumed. In configurations with one or more triggers, including for a single process, simultaneous processes, concurrent processes, or the like, it is desirable at scale to manage or reduce overhead for RPA deployments. This may be achieved by improved administration, development, distribution, coordination, registration, coding, design, resource management, or the like of triggers for a process(es).

SUMMARY

Trigger(s) administration, development, distribution, coordination, registration, coding, or the like for robotic process automation (RPA) is disclosed. A trigger(s) may be configured to run or execute outside a process, package, workflow, or the like in relation to robotic automation of an application or the like and associated event(s). A definition file(s) or configuration file(s) may be created or utilized for a trigger(s) for an event and a separate or outside service or component may be configured to listen for the event for an automation process. Once a trigger(s) is met, an action or activity may run as part of the automation process using the outside service or component. An RPA robot's ability to register, run, queue, locally edit, prioritize, or the like, a trigger or related action or activity is also disclosed.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
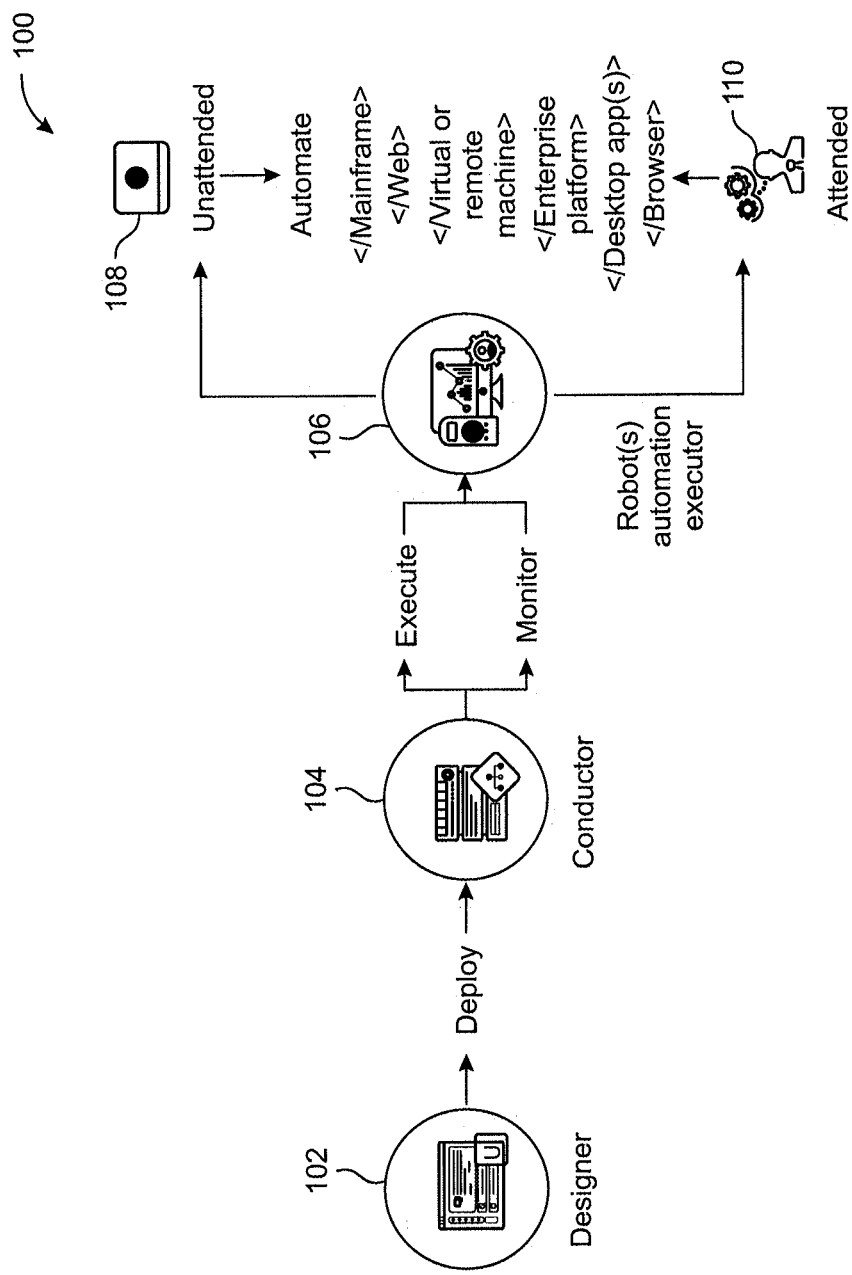
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for user interface (UI) robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language ((HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow against a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform(s).

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of RPA process or package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third-party inputs or control. For attended 110 operation, automation may be performed by receiving input, commands, instructions, guidance, or the like from a third-party component.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
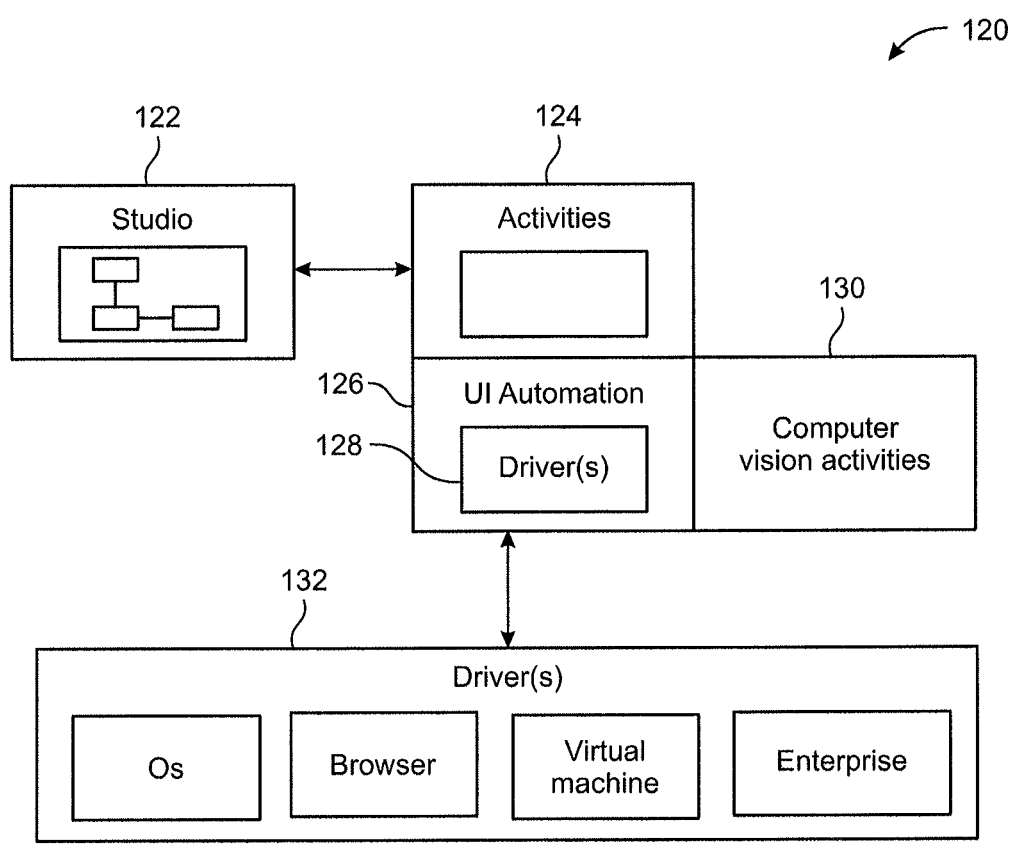
FIG. 1B is another illustration of RPA development, design, operation, or execution.
Figure 1C:
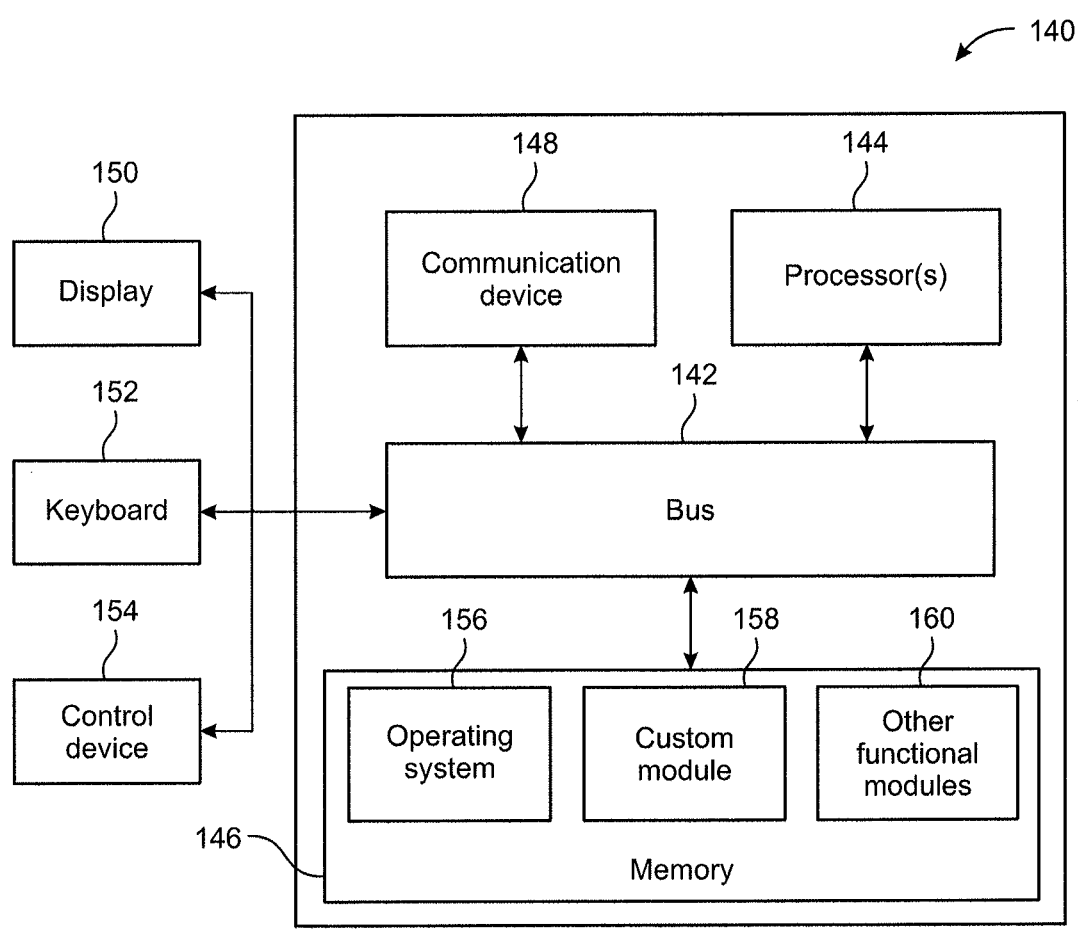
FIG. 1C is an illustration of a computing system or environment.

FIG. 1B is another illustration of RPA development, design, operation, or execution 120. A studio component or module 122 may be configured to generate code, instructions, commands, or the like for a robot to perform one or more activities 124. UI automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beam-steering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

A trigger may be utilized, loaded, run, exercised, or executed in relation to or within the context of a process(es), workflow(s), or the like, outside, separate, or independent of automation of a process or application(s). Context may include factors such as inherent priority or quality of service (QoS) requirements, queue prioritization such as first-in-first-out (FIFO), real-time user-defined priority, or the like.

A system may listen and wait for predetermined events or conditions such as a mouse event or keyboard event until a trigger condition or event is met, satisfied, or expires. To utilize trigger(s) for automation, a substantially always-on, real-time, or consistently on window service(s), set of service(s), windows process(es), set of process(es), or the like may be configured to listen for a user event(s), system event(s), file(s) changes, external events on another system, or the like in association with a defined trigger or definition of a trigger.

In out-of-process configurations, the listening may be performed by a service component outside or independent of automation scope without starting, running, resuming, or the like an RPA process. An RPA process may also be referred to as a package, RPA package, or the like which each may include a workflow(s) for RPA automation. Simultaneous attended automation and always-on event activity listening for triggers, queue processes initiated locally by a trigger, or the like may be undesirable or sub-optimal. Splitting or separating execution and listening into separate services may result in attended automation enhancement. Furthermore, an out-of-process configuration or arrangement may also allow a substantially large number of triggers to be set or configured without the overhead of administration, deployment, automation code, additional development, or the like. A trigger may be defined and configured based on a rule(s) or definition so that coding is substantially unnecessary for an existing RPA process and sent to an out-of-process service component for registration. Moreover, in certain configurations when a trigger(s) engages, intelligent queue and scheduling may be utilized for an RPA process or automation.

As such, a trigger(s) may be coded or created out of, separate from, or independent to the development environment. A development environment may be a software development kit (SDK) or a programming studio, such as RPA studio. An architecture out of, separate from, or independent to the development environment may reduce or eliminate the need to rebuild, re-develop, or update an automation process to edit or change a trigger. Subsequent to coding or creation, a trigger(s) may run or be executed in a separate service, window service, or the like. A separate service, window service, or the like may be customized for optimal performance and reliability for a given or predetermined application, enterprise application, application on the cloud, or the like.

Trigger coding or setup may be enveloped or specified in a definition file(s) or configuration file(s) created by a trigger rule editor, manually, by another system using compatible configuration file(s) or definition file(s) taxonomy, or the like. In certain configurations, instead of loading code for a trigger(s), a service component, configured by a definition file, may be processed on an ad-hoc basis based on user preferences for the trigger(s). A definition file(s) or configuration file(s) for a service component may be provided from a centralized component or source, an RPA conductor, an RPA orchestrator, created locally, edited locally, user customized, or the like. In certain configurations, if a service is always listening for an event, a definition file(s) or configuration file(s) may specify or utilize selectors to enable or disable substantially all existing triggers by type(s), element activity, or the like.

A selector may be a reference or pointer to an element such as an image, text, HTML tag, or the like in an application(s), a web page(s), or the like that a RPA robot can utilize in an automation or process. A selector(s) may be mapped or saved to a package(s), definition file(s), configuration file(s), or the like, for out-of-process to run, execute, or utilize by pushing to a local machine, client device, or the like by a conductor or orchestrator for one or more processes. This configuration may be utilized to enable or disable a trigger(s), use regular or typical expressions to match selectors against package(s), utilize static or dynamic input arguments for a package(s), or the like. In certain configurations, package(s), definition file(s), configuration file(s), or the like may be associated with a single process so that a user has access rights to run a list or set of available triggers.

As explained, in certain configurations trigger rules may be configured at development time, such as in studio, in relation to a process, package, RPA process, RPA package, RPA robot, a workflow of a package, RPA robot, or the like. A trigger rule or definition may contain a target(s), which may be a selector, windows process, a file or folder, or the like, and the type of trigger(s), which may include click triggers, keyboard triggers, process triggers, file change triggers, or the like. A trigger rule or definition may also contain the event, which may include a process or package to execute, pause, stop, an additional setting/pausing/canceling of triggers, a process start/stop, external events, or the like. The event may be related to a default priority or filters and extra conditions needed to satisfy a trigger rule or definition.

In certain configurations, a package may be an automation or RPA script that runs as an RPA robot. A package may be configured or referenced as a process or robot and be configured to invoke or start one or more other packages via a channel or connector. An RPA robot may be an application running on a machine that executes packages or other code. A trigger definition file(s) or configuration file(s) may comprise information in relation to an event(s) trigger for a set rule, information to set a trigger, information to set a trigger rule, additional or extra criteria needed for the rule to be triggered or suppressed, an action(s) related to a rule, rule priority, quality of service (QoS) factors for a rule, or the like. In addition, a trigger definition file(s) or configuration file(s) may indicate if a rule or part of a rule can be edited locally on a client device.

Furthermore, a trigger definition file(s) or configuration file(s) and related rule(s) may be loaded or run using different configurations. A user may utilize a trigger definition(s) or configuration file(s) on a client device or environment, such as through a robot tray or a third-party application integrated with the RPA robot, to turn on a trigger(s), turn off a trigger(s), set user specific criteria for a trigger(s), view access policies/rights for a trigger(s), configure access policies for a trigger(s), create a new user specific trigger, or the like. In certain configurations, a process may be configured to dynamically define, enable, disable, or the like a trigger(s) based on a pre-determined criteria. For example, a process(es) may enable a given trigger once at a time point, a flow point, a sequence point, or the like is reached instead of an arbitrary point since the given trigger may be unneeded. This configuration may give the user the ability to benefit from a complex series of automation steps and may be helpful for on-the-job training, guided walkthroughs, automations which require intermittent human intervention, process chaining, or the like. As a result, resources in a system, server, or client device may be saved or optimized.

Figure 2:
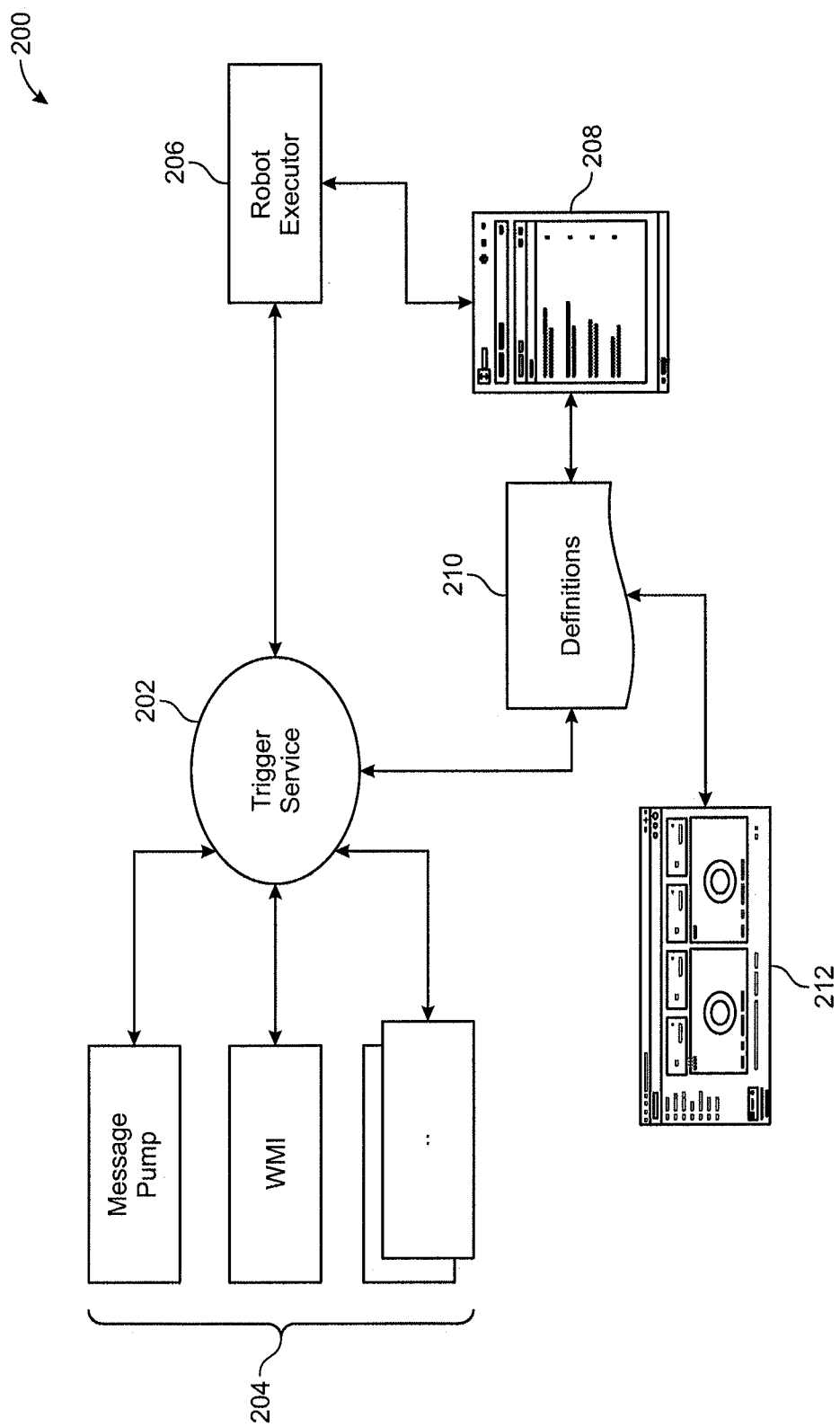
FIG. 2 is an illustration of an example of trigger service management.

FIG. 2 is an illustration of an example of trigger service management 200. However, robot executor 206 may be configured to decentralize trigger management in the enterprise, organization, or the like. As explained herein, an executor may be a sub-process of the robot that can run a package. Trigger service management 200 may be configured to operate transparently to robot executor 206. When a package or robot is distributed or administered outside of robot executor 206, such as via a conductor, orchestrator, or any other centralized component, configuration or rule definitions 210 may be utilized, loaded, or run by trigger service component 202. Trigger service component 202 may be configured to monitor or listen for one or multiple triggers and related events or rules. Trigger service component 202 may be configured locally on a machine or client device, such as through windows messenger. Interface 208 may be configured to display current RPA robot actions or activities of robot executor 206.

As explained herein, configuration or rule definitions 210 may be loaded or run through orchestrator or conductor 212. In certain configurations, trigger service component 202 may be configured to accept, deny, or defer an update(s) configuration or rule definitions 210. For instance, in attended RPA deployments or configurations, a human may approve the trigger before processing for security, authentication, human-in-the-loop security, human-in-the-loop verification, or the like. A process may include a sub-process that is a sub-section of a process, a micro-bot, a module, or the like. In addition, in trigger service management 200, a definition file(s) or configuration file(s) may be edited locally on a client device or environment.

Trigger service component 202 may monitor a requested event(s) for optimization based on one or more components 204 that are outside the trigger service. One or more components 204 may be windows elements that trigger service component 202 may utilize to subscribe or listen to for a trigger(s). One or more components 204 may also be combined to register a new trigger with windows through a message pump or windows management instrumentation (WMI) and/or tap into an existing trigger and filter results based on criteria of a definition file(s) or configuration file(s). This may improve scaling and minimize impact on client device, server, or system resources. With respect to scale, trigger service management 200 may reduce overhead for editing, authoring, or distributing code to change a trigger component by an administrator, management of extra processes and users for simultaneous processes monitoring specified event(s), or the like. Improvements may include better cache management, reduced CPU utilization, reduced memory utilization, quicker response times, or the like.

A trigger or trigger event(s) may comprise one or more of a mouse click(s), keyboard event(s), keyboard press(es), image click, touch input(s), screen input(s), on-screen element change, process start, process stop, file change, folder change, universal resource locator (URL) input, navigation input, replay event, undesirable online user navigation, desirable user navigation, external trigger, an event on another system, or the like. In examples given herein, a robot may be configured to execute a different process(es) when a mouse click(s) is a right click, left click, or the like. Screen element input event(s) may comprise identification of clicking certain element(s) on the interface, such as create record, apply, etc., or monitor of certain element(s) appearing on screen.

A mouse trigger component may monitor, such as with a monitor event activity or object, a specific mouse key input, click, button, or combination with other inputs or keys related to an activity. The activity may be a system wide event. A mouse input, activity, or action may be performed in relation to a UI element or object. A replay user event may replay a user event that was triggered.

A system trigger component may be configured to monitor a specified system-wide key, keyboard, or mouse event in relation to a monitor event activity. In certain configurations, a system trigger may be associated with an event mode for blocking actions on a UI element. In addition, a click trigger may monitor click events, including children elements, on a specified UI element within a monitor events activity. A click may be a mouse button input or text selection related to a graphical user interface (GUI) element. A click may be associated with a clipping region of a clipping rectangle, in pixels, relative to a UI element and association UI directions. The monitored event activity may be synchronous or asynchronous. A click trigger may be associated with an event mode for possible blocking actions on a UI element.

A key press trigger component may be related to monitoring a keyboard, touchpad, trackpad, touchscreen, or the like events on a specified UI element or object in relation to a monitor events activity. Variables for this trigger may include key, special key, a selector for a text property to find a particular UI element or object when the activity is executed, or the like. Other variables may include synchronous event type, asynchronous event type, children of the UI element, a key press action that is blocked for a UI element, and a selected key modifier to the activity. In addition, a hot-key trigger may monitor a specified system-wide key, including special key or windows hot-key, event within a monitor events activity. An event mode may specify that a key press is blocked from acting on UI elements. A hot-key may be associated with an event mode for possible blocking of actions on a UI element.

Moreover, a replay may be associated with a key press trigger or click image trigger. A replay may be associated with a monitored event activity. The monitored event activity may be synchronous or asynchronous.

In certain configurations, a block user input may be utilized as a container or package that disables a mouse and keyboard when activities inside it run. This component may be configured to block either mouse, keyboard, special key, or both inputs. This component may permit a designated hot-key combination to re-enable a user input. Other re-activation processes may also be configured. A control parameter set to continue on error may specify if the automation may continue or cease when an activity throws an error or exception.

A monitor event component may listen for multiple activities or triggers and executes the activities specified in an event handler container or package. For event frequency, a control parameter set to true may block execution every time the trigger is activated. For a control parameter set to false, the activity may execute one time. A control parameter set to continue on error may specify if the automation should continue or cease when an activity throws an error or exception.

A get source component may extract UI element or object in relation to a performed action or activity for a trigger. Activities for this element may include a key press trigger, click image trigger, click trigger, or the like. This element may be performed within a monitor event(s) activity. Similarly, a get event info component may enable extraction of different types of information related to a trigger.

For changes to a file(s) or folder(s), certain configurations may identify addition, deletion, changes, or the like of certain files or folders as a trigger. Identification may be performed by monitoring changes in a file name, a file path, file properties, or the like. These trigger events can be set by the user and associated with each process in a list or set of processes. An identified process may be executed if a monitored condition is matched or met. Certain configurations may also allow triggering a process by providing the user interface to initiate execution of RPA process(es). Managed processes and self-developed processes may be displayed on an interface and, on clicking a run button from the menu, execution of the identified process may be initiated. In addition, processes may be scheduled such that managed and self-developed processes are configured to be executed at certain point in time.

A click image trigger component may monitor an image defined by the target UI element for input, such as a mouse input, mouse click, or touch input, within a monitor events activity. Image accuracy may be related to this trigger such that a unit of measurement from 0 to 1 may express minimum similarity between an image being searched and one to be found. Image profile may be utilized to change or select an image detection algorithm, such as basic or enhanced detection. This trigger component may be related to a clipping region for clipping a rectangle, in pixels, relative to the UI element and related a UI direction. A selector may be associated with a text property for this trigger component. Event type may include synchronous event type, asynchronous event type, or the like.

Figure 3:
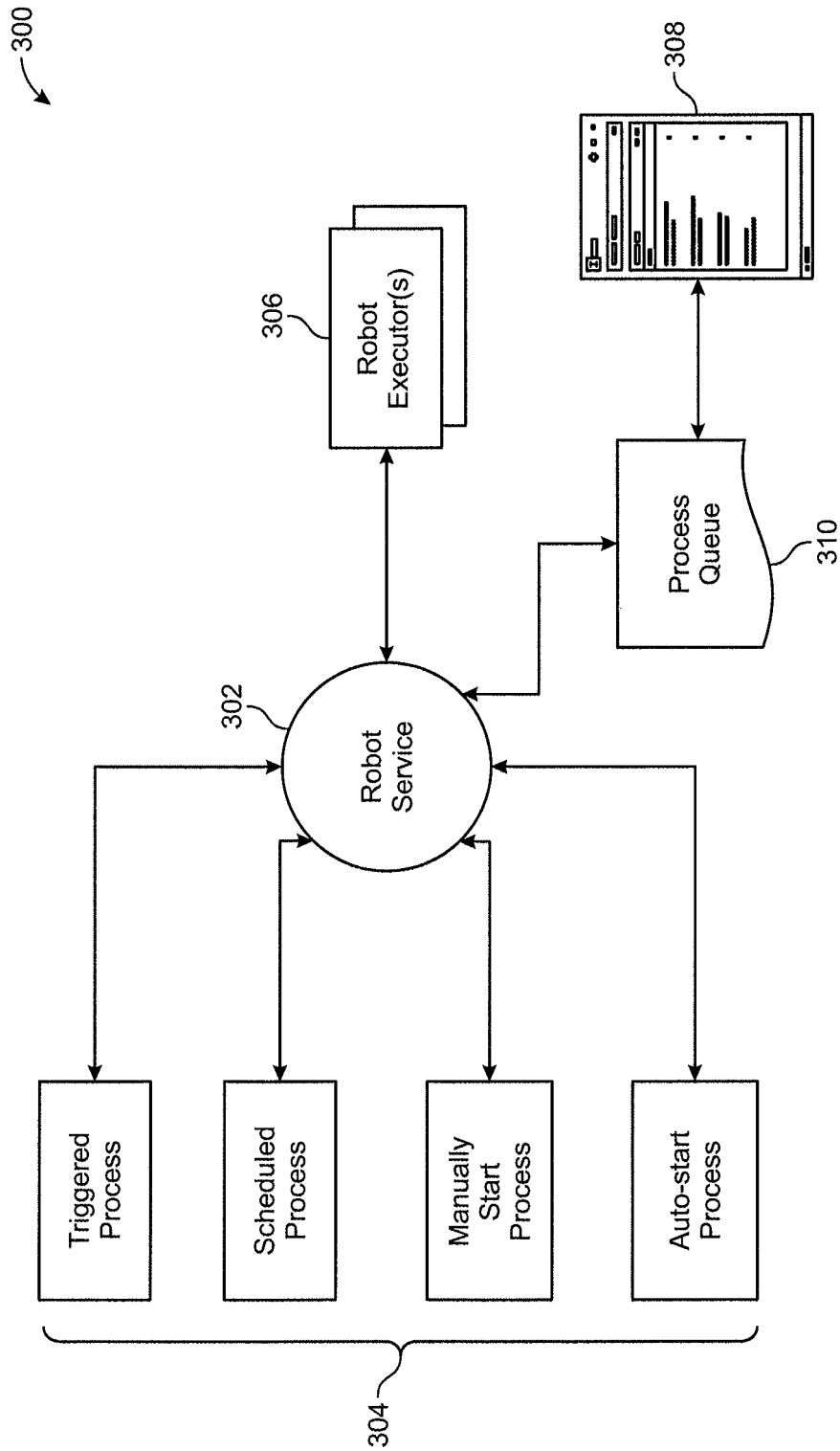
FIG. 3 is an illustration of an example of process queue management for a robot(s)

FIG. 3 is an illustration of an example of process 300 for queue management for a robot(s). A process queue may be configured locally on a machine or client device for an attended robot. A request(s) for automation may come from one or more different sources for attended robot automation. As described herein, a trigger(s) component may detect a change to the file system, the user may start a process, a process may be triggered via a schedule with a short time period, or the like. In configurations with a workflow(s) in a same package(s), an internal or intelligent queuing component may accept and queue a request(s) sequentially. However, sequential request processing may be undesirable when a request(s) for automation comes from one or more different sources.

In process 300, for queue management for a robot(s), robot service 302 may use process queue component 310 to start, stop, or pause one or more robot executors 306 of which there may be one or multiple-overlapping requests. Interface 308 may be configured to display current RPA robot actions or activities of one or more robot executors 306. A request may be one received from an out-of-process trigger service component, such as trigger service component 202. A set of rule constructs, criteria, or default condition may be configured so that a robot may assess a process(s) to deliver a performance level, responsiveness, QoS, or the like. If requests overlap, a rule or criteria may be utilized by robot service 302 to select a request for one or more services, processes, or workflows. Robot service 302 may communicate with and receive requests from various entry point components 304 that include triggered process component, schedule process component, manual start process component, or auto-start process component for managing a queue with process queue component 310 to start or in relation to a process.

A triggered process entry point may be arranged and utilized similar to trigger service management 200. In addition, a process may be associated with a base priority based on the process request source, the time of day, a preconfigured value, or the like. In addition, if a process is configured for foreground or background operation, queuing may be skipped and the process may be executed in parallel. As such, process 300 provides different mechanisms for a request to start, stop, or pause a process or service. In addition, process queue component 310 allows a robot service to ensure a request is delivered or saved for later processing.

Manual start process component may, including in substantially real-time, receive command(s) or input(s) from a user to observe process queue component 310 and reprioritize, cancel, or add additional requests. In addition, a high or higher priority process(es) may be configurable to override another foreground or background operation. A user input may also pause a current process so that a high or higher priority process(es) completes with or without using additional resources on a client device, server, or system.

In certain configurations given herein, a software robot or RPA robot may train or learn new skills through a self-development engine. For instance, a self-development engine may map or link processes with monitored actions or activities in relation to a trigger service. Furthermore, an assisted robot or attended robot may be configured only for a single person or project for security, verification, optimization, customization, or the like.

Figure 4:
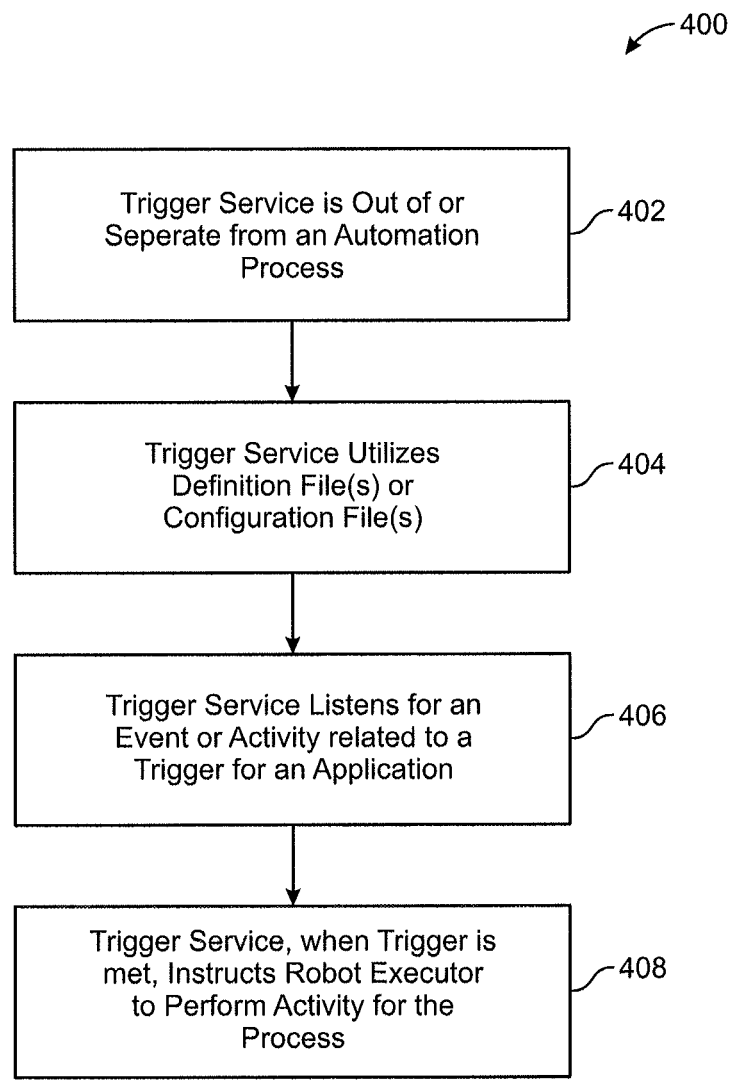
FIG. 4 is an illustration of an example of a process for trigger service management.

FIG. 4 is an illustration of an example of a process for trigger service management 400. A trigger service may be loaded or executed out of or separate from an automation process (402). The trigger service may be configured locally on a machine or client device. A trigger service may utilize a definition file(s) or configuration file(s) (404). The trigger service may listen for an event, activity, or action related to the trigger for an application (406). When a trigger is met, the trigger service may instruct a robot executor to perform the activity or action for the process or package (408).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
    a processor and a memory configured to execute a trigger service, wherein the trigger service is separate from an automation process and registered using a windows component;
    the processor and the memory further configured to execute a definition file or a configuration file, each having rules, for the trigger service, wherein the trigger service is configured to listen, based on the definition file or the configuration file, for a mouse event, a keyboard event, or an activity related to a trigger for the automation process, wherein a selector is mapped to the definition file or the configuration file to push, to the computing device, an instruction to enable or disable the trigger; and
    the processor configured to instruct, on a condition that the trigger is expired, a software robotic automation executor to perform the event or the activity for the automation process.

2. The computing device of claim 1 further comprising a queue configured to manage requests for the software robotic automation executor in relation to the automation process.

3. The computing device of claim 1, wherein the automation process automates an application on the computing device.

4. The computing device of claim 1, wherein the automation process is utilized on another computing device.

5. The computing device of claim 1, wherein the definition file or the configuration file is executed based on an instruction from an orchestrator.

6. The computing device of claim 1, wherein the trigger service utilizes a listen component to listen for the event or the activity related to the trigger.

7. The computing device of claim 1, wherein the automation process is part of a package and the rules are related to the package.

8. A method performed by a computing device, the method comprising:
    executing, by the computing device, a trigger service, wherein the trigger service is separate from an automation process and registered using a windows component;
    executing, by the computing device, a definition file or a configuration file, each having rules, for the trigger service;
    listening, by the trigger service based on the definition file or the configuration file, for a mouse event, a keyboard event, or an activity related to a trigger for the automation process, wherein a selector is mapped to the definition file or the configuration file to push, to the computing device, an instruction to enable or disable the trigger; and
    instructing, by the computing device on a condition that the trigger is expired, a software robotic automation executor to perform the event or the activity for the automation process.

9. The method of claim 8 further comprising managing, by a queue, requests for the software robotic automation executor in relation to the automation process.

10. The method of claim 8, wherein the automation process automates an application on the computing device.

11. The method of claim 8 further comprising utilizing the automation process on another computing device.

12. The method of claim 8, wherein the definition file or the configuration file is executed based on an instruction from an orchestrator.

13. The method of claim 8, wherein the trigger service utilizes a listen component to listen for the event or the activity related to the trigger.

14. The method of claim 8, wherein the automation process is part of a package and the rules are related to the package.

15. A computing device comprising:
    a processor and a memory configured to execute a trigger service, wherein the trigger service is separate from an automation process and registered using a windows component;
    the processor and the memory further configured to execute a definition file, having rules, for the trigger service, wherein the trigger service is configured to listen, based on the definition file, for a mouse event, a keyboard event, or an activity related to a trigger for the automation process, wherein a selector is mapped to the definition file or the configuration file to push, to the computing device, an instruction to enable or disable the trigger;
    the processor configured to instruct, on a condition that the trigger is expired, a software robotic automation executor to perform the event or the activity for the automation process; and
    the process configured to receive an instruction from a queue, wherein the queue manages requests for the software robotic automation executor in relation to the automation process.

16. The computing device of claim 15, wherein the trigger service utilizes a listen component to listen for the event or the activity related to the trigger.

17. The computing device of claim 15, wherein the automation process automates an application on the computing device.

18. The computing device of claim 15, wherein the automation process is utilized on another computing device.

19. The computing device of claim 15, wherein the definition file or the configuration file is executed based on an instruction from an orchestrator.

20. The computing device of claim 15, wherein the automation process is part of a package and the rules are related to the package.

* * * * *